(12) United States Patent
Krumböck et al.

(10) Patent No.: US 6,779,994 B2
(45) Date of Patent: Aug. 24, 2004

(54) APPARATUS FOR COOLING AND CALIBRATING AN EXTRUDED PLASTIC PROFILE

(75) Inventors: Erwin Krumböck, Ansfelden (AT); Wolfgang Gasselseder, Oberneukirchen (AT)

(73) Assignee: a + g extrusion technology GmbH, Pasching (AT)

( * ) Notice: Subject to any disclaimer, the term of this patent is extended or adjusted under 35 U.S.C. 154(b) by 197 days.

(21) Appl. No.: 10/214,816

(22) Filed: Aug. 8, 2002

(65) Prior Publication Data
US 2003/0031743 A1 Feb. 13, 2003

(30) Foreign Application Priority Data
Aug. 10, 2001 (AT) .......................................... 1255/2001

(51) Int. Cl.[7] .............................................. B29C 47/90
(52) U.S. Cl. ................ 425/72.1; 264/209.3; 264/209.4; 425/326.1; 425/378.1; 425/380
(58) Field of Search .......................... 425/326.1, 72.1, 425/378.1, 380, 388, 71; 264/167, 209.3, 209.4

(56) References Cited

U.S. PATENT DOCUMENTS 4,411,613 A * 10/1983 Gauchel et al. ............. 425/388
4,575,326 A * 3/1986 French ...................... 425/388
6,296,464 B1 * 10/2001 Purstinger .................. 425/72.1
6,394,782 B1 * 5/2002 Grassi ....................... 425/388
6,682,330 B2 * 1/2004 Kossl ........................ 425/388

FOREIGN PATENT DOCUMENTS

DE 25 35 286 2/1977
DE 28 09 386 9/1979

* cited by examiner

Primary Examiner—Tim Heitbrink
(74) Attorney, Agent, or Firm—Collard & Roe, P.C.

(57) ABSTRACT

An apparatus for cooling and calibrating and extruded plastic profile (2) is described, with a cooling tank (4) which receives a cooling liquid (12) and can be charged with a pressure below atmospheric, and with at least one calibrating device (5) arranged within the cooling tank (4) for the plastic profile (2) pulled through the cooling tank (4), with the calibrating device (5) being composed of individual parts extending in the direction of passage of the plastic profile (2). In order in to provide advantageous construction conditions it is proposed that the parts of the calibrating device (5) form calibrating elements (8) which are distributed over the circumference of the plastic profile (2) by leaving out gaps (15) for the passage of cooling liquid.

6 Claims, 3 Drawing Sheets

APPARATUS FOR COOLING AND CALIBRATING AN EXTRUDED PLASTIC PROFILE

FIELD OF THE INVENTION

The invention relates to an apparatus for cooling and calibrating an extruded plastic profile with a cooling tank which receives a cooling liquid and can be charged with a pressure below atmospheric, and with at least one calibrating device arranged within the cooling tank for the plastic profile pulled through the cooling tank, with the calibrating device being composed of individual parts extending in the direction of passage of the plastic profile.

DESCRIPTION OF THE PRIOR ART

During the extrusion of plastic profiles, the hot profile strand emerging from the shaping extrusion die is calibrated and cooled, with a cooling tank being provided for cooling through which the plastic profile is pulled with the help of a draw-off device provided downstream of the cooling tank. The plastic profile is treated within the cooling tank with a cooling liquid, which is generally water. The dimensional accuracy is thus ensured by calibrating elements through which the plastic profile is guided within the cooling tank. Said calibrating elements which are adjusted to the cross-sectional shape of the plastic profile are arranged on the inlet side of the cooling tank at a small distance from each other, which distance increases gradually towards the outlet side of the cooling tank. As a result of these increasing distances in the direction of passage between the successive calibrating elements it is intended to limit the number of calibrating elements to a number which is necessary for securing the dimensional accuracy. Notice must be taken in this connection that the strength and the ability to hold the shape is still very low in the inlet zone of the cooling tank due to the only gradually progressing solidification progressing from the outside to the inside, so that the plastic profile needs to be supported with low axial distance by the calibrating elements in order to avoid any bulging of the profile walls in the zone of hollow chambers between the successive calibrating elements due to the usual pressurization of the cooling tank with pressure below atmospheric. Despite the enlargement of the mutual distances of the calibrating elements which is possible depending on the solidification-induced increase in the dimensional stability of the plastic profile, the required number of calibrating elements remains high, leading to a high production effort for such calibrating devices. When setting the calibrating device which consists of a plurality of calibrating elements, the profile elements are subsequently machined in several tests on the basis of deviations of the profile cross section from the setpoint cross section which are determined in said tests, with the amount of work for such subsequent machining increasing with the number of used calibrating elements. This applies especially when the cross section of the profile elements needs to be reduced in sections, which then frequently requires displacements of individual parts of the calibrating elements with respect to each other, the provision of additional inserts and a partly new production of calibrating elements.

Calibrating devices are also used instead of calibrating elements which form a cooling block which can be charged with a cooling liquid with a continuous calibrating opening, through which the plastic profile is drawn. Vacuum slots opening into the zone of the calibrating opening ensure that the plastic profile rests on the wall of the calibrating opening. In order to simplify the production of such calibrating devices it is known (DE 28 09 386 A1, DE 25 35 286 A1) to construct the cooling blocks from individual parts which extend in the direction of passage of the plastic profile and are screwed together into a cooling block forming the calibrating opening. These known calibrating devices are hardly suitable for a direct charging of the plastic profile with cooling liquid.

SUMMARY OF THE INVENTION

The invention is thus based on the object of providing an apparatus for cooling and calibrating an extruded plastic profile of the kind mentioned above in such a way that the calibrating device can be set up in a considerably easier way for a plastic profile due to a reduction in the amount of work required for construction.

This object is achieved by the invention in such a way that the parts of the calibrating device form calibrating elements which are distributed over the circumference of the plastic profile by leaving out gaps for the passage of cooling liquid.

The invention is based on the finding that for calibrating an extruded plastic profile in a cooling tank pressurized with a pressure below atmospheric it is not necessary to provide a circumferentially enclosed support of the plastic profile in the event that a support is ensured in such circumferential areas which tend to arch due to the pressurization with pressure below atmospheric. This is essentially only the case in the middle zone of profile walls delimiting existing hollow chambers, so that the conventional, circumferentially enclosed calibrating elements can be replaced by calibrating elements which extend along the calibrating device in the direction of passage of the plastic profile and are distributed over the circumference of the plastic profile by leaving out gaps for the passage of cooling liquid. The gap resulting between the calibrating elements ensures a direct cooling of the plastic profile by the cooling liquid, i.e. in such regions which have a higher cooling requirement due to corner formations or wall connections. The cooling via the calibrating elements of the middle regions of the profile walls which rest on the calibrating elements and delimit existing hollow chambers is thus sufficient, in cooperation with the liquid cooling between the calibrating elements, for a thorough solidification of the plastic profile during the passage through the calibrating device. Since the profile cross section to be calibrated is determined through the calibrating elements that continue over the calibrating device, it is merely necessary to machine the calibrating elements for the purpose of adjustment of the calibrating device to predetermined conditions, as a result of which the efforts for adjusting the calibrating device are substantially reduced. Moreover, the resistance to the passage of the plastic profile by the calibrating device can be reduced in comparison with calibrating devices made up of individual calibrating elements.

The fixing of the calibrating elements in their assignment determining the profile cross section can be solved constructionally in different ways. Particularly simple constructional conditions are obtained, however, when the calibrating elements are fastened detachably in at least two frames arranged transversally to the direction of passage, so that the calibrating elements form in combination with the frame a sufficiently dimensionally stable, self-supporting frame without obstructing the machining of individual calibrating elements which can be removed for this purpose from the frame.

As has already been explained, it can be assumed that the direct cooling of the plastic profile via the close-lying calibrating elements provides favorable cooling conditions in many cases in cooperation with the direct cooling by the cooling liquid. If the cooling performance needs to be increased, at least individual cooling elements can form cooling channels extending transversally to the direction of passage at the sides facing the plastic profile, so that the cooling is increased in the zone of the calibrating elements. If the cooling channels extend in an inclined manner with respect to the direction of passage, a conveying effect is obtained on the cooling liquid in the zone of the cooling channels by the plastic profile pulled through the calibrating device, leading to a further improvement of the cooling. The indirect cooling via the calibrating elements can be increased in such a way that at least individual calibrating elements are provided with longitudinal bores which are charged with cooling liquid, thus ensuring a favorable discharge of the heat absorbed from the cooling elements. Said longitudinal bores of the calibrating elements which are charged with cooling liquid can be additionally in connection with the cooling channels of the calibrating elements in order to bring about a forced circulation of the cooling liquid in the zone of said cooling channels.

BRIEF DESCRIPTION OF THE DRAWINGS

The object of the invention is shown by way of examples in the drawings, wherein:

FIG. 4 shows a sectional view along line IV—IV of FIG. 3 on a smaller scale, and FIG. 5 shows an embodiment of an additionally cooled calibrating element in a cross-sectional view on an enlarged scale.

DESCRIPTION OF THE PREFERRED EMBODIMENTS

Figure 1:
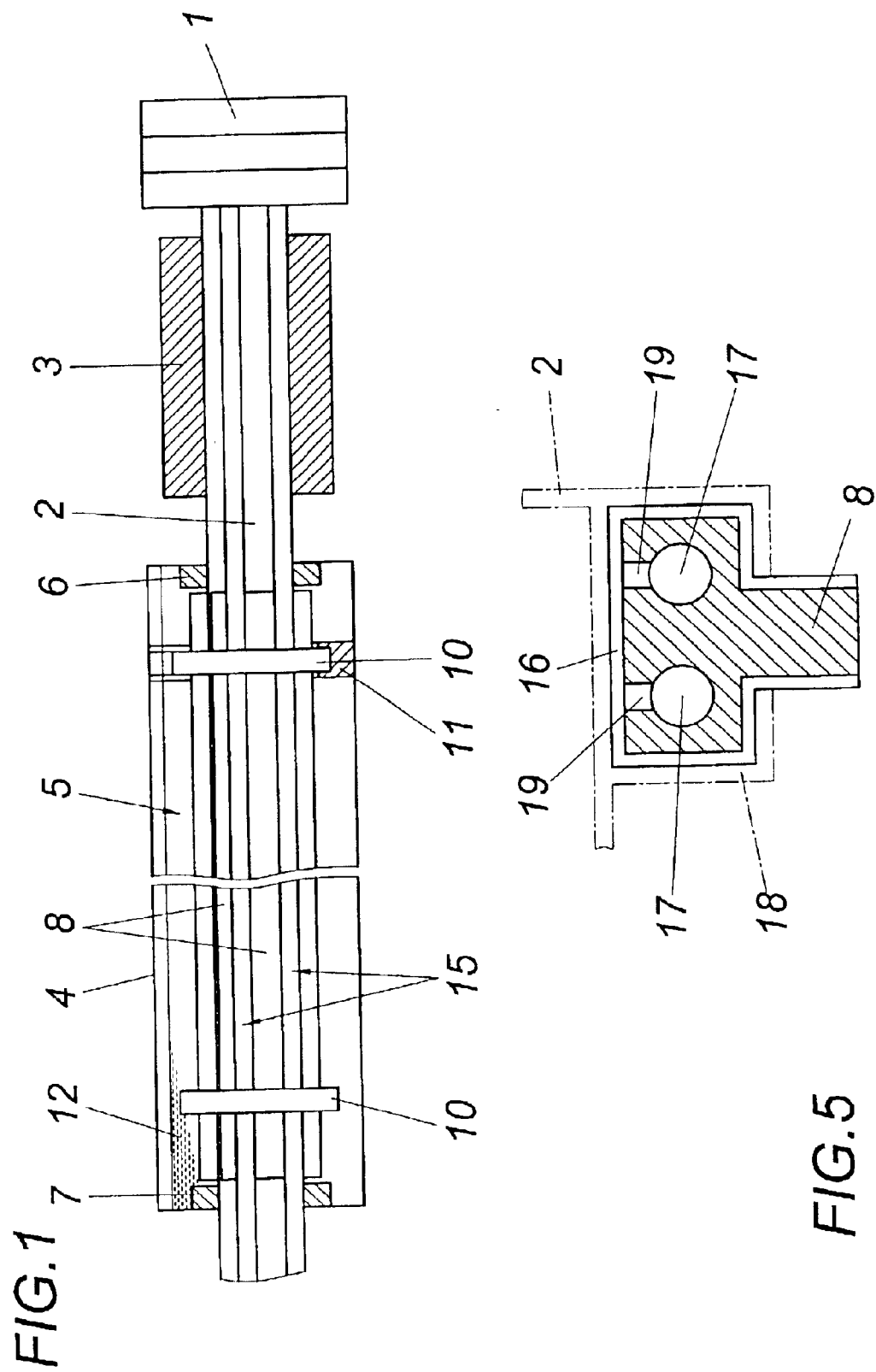
FIG. 1 shows an apparatus in accordance with the invention for cooling and calibrating an extruded plastic profile in a schematic longitudinal sectional view.
Figure 2:
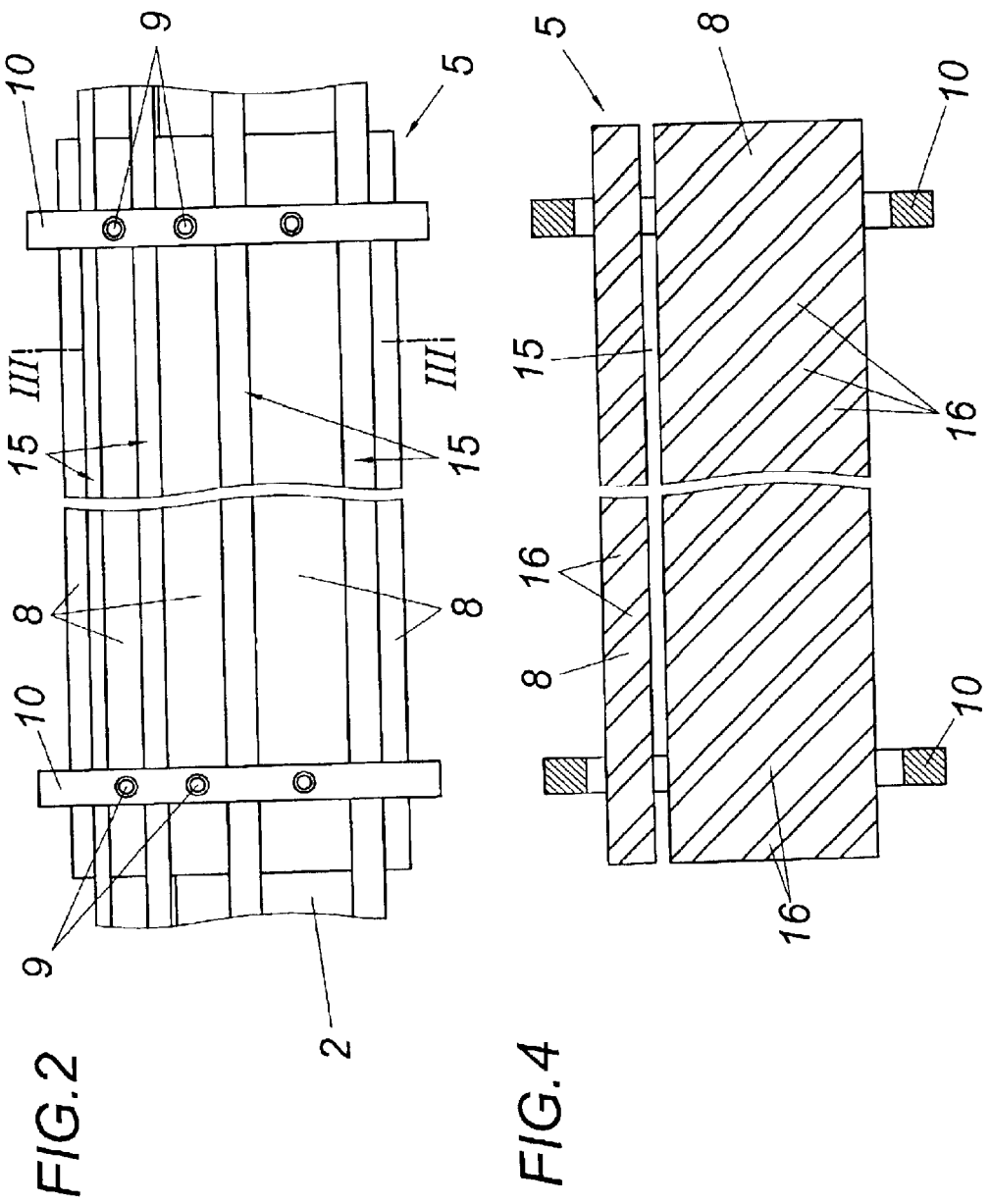
FIG. 2 shows a calibrating device which can be inserted in a cooling tank in a schematic side view on an enlarged scale.

As is shown in FIG. 1, the hot plastic profile 2 emerging after an extruder from an extrusion die 1 for profiles is pulled through a dry calibrator 3 before passing through a cooling tank 4 in which at least one calibrating device 5 is provided in order to also ensure the dimensional accuracy of the plastic profile 2 during the cooling. The calibrating device 5 which is arranged between an inlet element 6 and an outlet element 7 for the plastic profile 2 substantially consists of individual calibrating elements 8 which continue over the length of the calibrating device 5 and are arranged at a distance from each other about the plastic profile 2, as is shown especially in FIG. 3. Said calibrating elements 8 are detachably held with the help of fastening screws 9 in frames 10 which are arranged transversally to the plastic profile 2, which frames are provided with respective recesses for receiving the calibrating elements 8. In order to axially fix a frame 10 with respect to the cooling tank 4, said frame can be inserted into a guide means 11 according to FIG. 1. The cooling tank 4 is filled with a cooling liquid 12 which covers the calibrating device 5. The closed cooling tank 4 is charged with a pressure below atmospheric, so that the plastic profile pulled through the cooling tank 4 and through the calibrating device 5 within the cooling tank 4 is pressed outwardly in the zone of its hollow chambers 13 against the calibrating elements 8. For constructional reasons it may be necessary in longer cooling tanks 4 to split up the calibrating elements 8 among two or more calibrating devices 5 which are disposed directly one after the other in the direction of passage.

Figure 3:
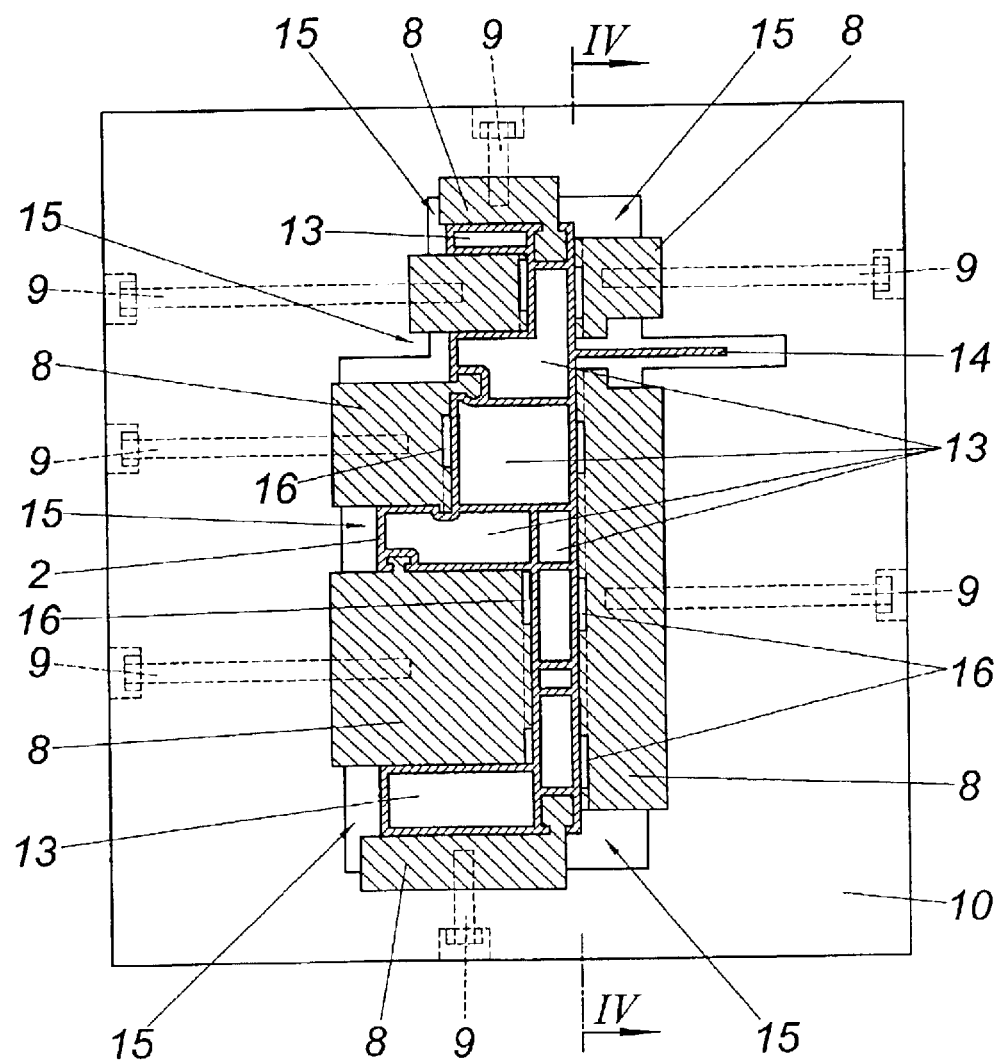
FIG. 3 shows a sectional view along line III—III of FIG. 2 on an enlarged scale.

Although the calibrating elements 8 do not fully enclose the plastic profile 2, a sufficient support of the plastic profile 2 for a dimensionally accurate cooling is achieved. One must consider in this connection that the profile walls will bulge in the zone of the hollow chambers 13 merely in their middle region and not in the connecting zone at transversal walls or corners, because the plastic profile 2 is subjected to a sufficient stiffening in the corner zone and in the connecting zone of the transversal walls. If the plastic profile 2 to be cooled is provided with projecting bridges 14, said bridges 14 can be cooled depending on the given circumstances without any support by the calibrating elements, as is shown in FIG. 3. If necessary, such bridges 14 can be guided on one side and in special cases even on both sides by calibrating elements.

The gap 15 between the calibrating elements 8 is necessary for the direct cooling of the plastic profile 2 by the cooling liquid 12. In the zone of the close-lying calibrating elements 8 only a direct cooling via the calibrating elements 8 is possible. If said direct cooling via the calibrating elements 8 in the zone of the contact surface is not sufficient, the calibrating elements 8 can be provided with cooling channels 16 on the side facing the plastic profile 2, which channels are formed by grooves in the calibrating elements 8 and extend preferably inclined to the direction of passage of the plastic profile 2. As a result of this inclined arrangement of the cooling channels 16 as indicated in FIG. 4 there is a conveying effect on the cooling liquid 12 by the plastic profile 2 pulled in the zone of the cooling channels 16 through the calibrating device 5, as a result of which the cooling effect is supported.

As is shown in FIG. 5, the calibrating elements 8 themselves can be cooled in that the calibrating elements 8 are provided with longitudinal bores 17 through which cooling liquid is pumped. If such calibrating elements 8 are used for guiding the plastic profile 2, e.g. in the zone of the undercut profile grooves 18 as shown with the dot-dash line in FIG. 5, the calibrating elements 8 can be provided in the zone of the undercut grooves 18 with cooling channels 16 extending transversally to the direction of passage, which channels are in flow connection with the longitudinal bores 17 via transversal bores 19, so that cooling liquid can be pumped via the cooling channels 16 for the direct cooling of the undercut grooves 18.

The measures as explained above allow performing the cooling and calibration of plastic profiles 2 in a cooling tank 4 with a comparable low amount of construction work. There is an additional advantage in the form of a continuous profile support in the direction of passage. It is merely necessary to consider the cooling-induced shrinkage of the plastic profile 2 via the calibrating elements 8 in order to not only reduce the amount of construction work but also to improve the dimensional accuracy.

What is claimed is:

1. An apparatus for cooling and calibrating an extruded plastic profile (2) with a cooling tank (4) which receives a cooling liquid (12) and can be charged with a pressure below atmospheric, and with at least one calibrating device (5) arranged within the cooling tank (4) for the plastic profile (2) pulled through the cooling tank (4), with the calibrating device (5) being composed of individual parts extending in the direction of passage of the plastic profile (2), characterized In that the parts of the calibrating device (5) form calibrating elements (8) which are distributed over the circumference of the plastic profile (2) and which leave gaps between said elements (15) for the passage of cooling liquid.

2. An apparatus as claimed in claim 1, characterized in that the calibrating elements (8) are provided in the zone of the hollow chambers (13) of the plastic profile (2).

3. An apparatus as claimed in claim 1, characterized in that the calibrating elements (8) are detachably fastened to at least two frames (10) which are arranged transversally to the direction of passage.

4. An apparatus as claimed in claim 1, wherein said calibrating elements (8) on the sides facing the plastic profile (2) form cooling channels (16) extending transversally to the direction of passage.

5. An apparatus as claimed in claim 4, characterized in that the cooling channels (16) extend inclined with respect to the direction of passage.

6. An apparatus as claimed in claim 1, wherein said calibrating elements (8) are provided with longitudinal bores (17) which can be charged with cooling liquid (12), which bores are flow-connected with cooling channels (16) on the sides of the calibrating elements (8) facing the plastic profile (2).

* * * * *